(12) United States Patent
Hartmann

(10) Patent No.: US 7,895,909 B2
(45) Date of Patent: Mar. 1, 2011

(54) MOVEMENT CONVERSION DEVICE FOR A HAND-HELD POWER TOOL

(75) Inventor: Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 1442 days.

(21) Appl. No.: 10/988,259

(22) Filed: Nov. 12, 2004

(65) Prior Publication Data

US 2005/0109137 A1    May 26, 2005

(30) Foreign Application Priority Data

Nov. 20, 2003   (DE) ................................. 103 54 295

(51) Int. Cl.
| | |
|---|---|
| *F16H 21/00* | (2006.01) |
| *B23D 49/00* | (2006.01) |
| *B27B 3/12* | (2006.01) |
| *B27B 3/26* | (2006.01) |
| *B27B 19/00* | (2006.01) |

(52) U.S. Cl. ............................................. 74/25; 30/392

(58) Field of Classification Search .............. 74/25, 406, 74/409, 411; 30/392, 394

See application file for complete search history.

(56) References Cited

U.S. PATENT DOCUMENTS

| | | | | | |
|---|---|---|---|---|---|
| 2,175,499 | A | * | 10/1939 | Wodack et al. ................. | 30/371 |
| 3,443,449 | A | * | 5/1969 | Kotarski .......................... | 74/422 |
| 4,031,763 | A | * | 6/1977 | Eisenberg ......................... | 74/50 |
| 5,099,705 | A | * | 3/1992 | Dravnieks ........................ | 74/50 |
| 5,134,777 | A | * | 8/1992 | Meyer et al. .................... | 30/392 |
| 5,907,971 | A | * | 6/1999 | Sato et al. ......................... | 74/96 |

FOREIGN PATENT DOCUMENTS

DE     3633888     4/1988

* cited by examiner

*Primary Examiner* — Justin Krause

(74) *Attorney, Agent, or Firm* — Abelman, Frayne & Schwab

(57) ABSTRACT

A movement conversion device (4) for a motor-driven, hand-held, power tool (2) for converting a rotational movement into a linear reciprocating movement includes an axially reciprocating spindle (10), a motor-driven driving gear (20), an eccentric member (16) displaceably supported on the driving gear (20) and extending into the connecting link guide (14) provided at a spindle end for converting the rotational movement of the driving gear (20) into the reciprocating movement of the reciprocating spindle (10), the eccentric member (16) having a first position with respect to a rotational axis (D) of the driving gear (20) in which a distance (a) between the eccentric member (16) and the rotational axis (D) is greater than in at least one second position of the eccentric member (16), and a load-controlled spacing device associated with the eccentric member (16) for automatically adjusting the distance (a) between the eccentric member (16) and the rotational axis (D) of the driving gear (20).

9 Claims, 5 Drawing Sheets

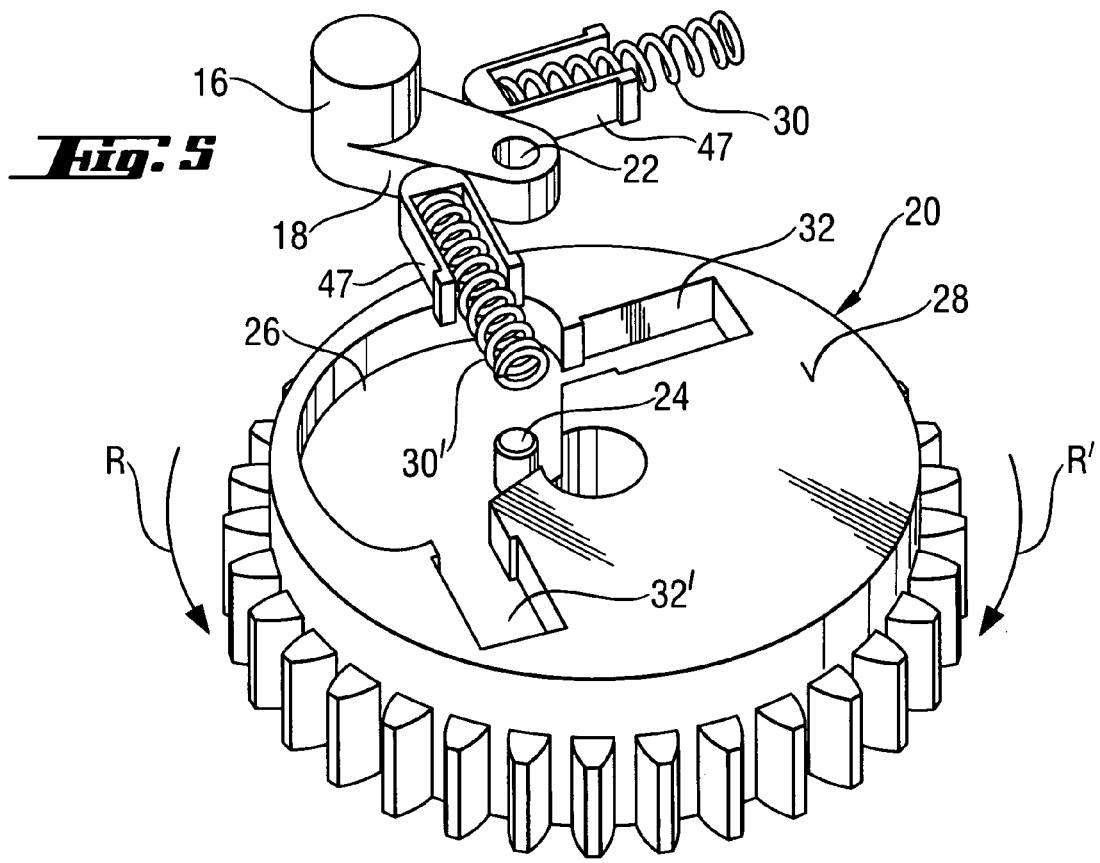
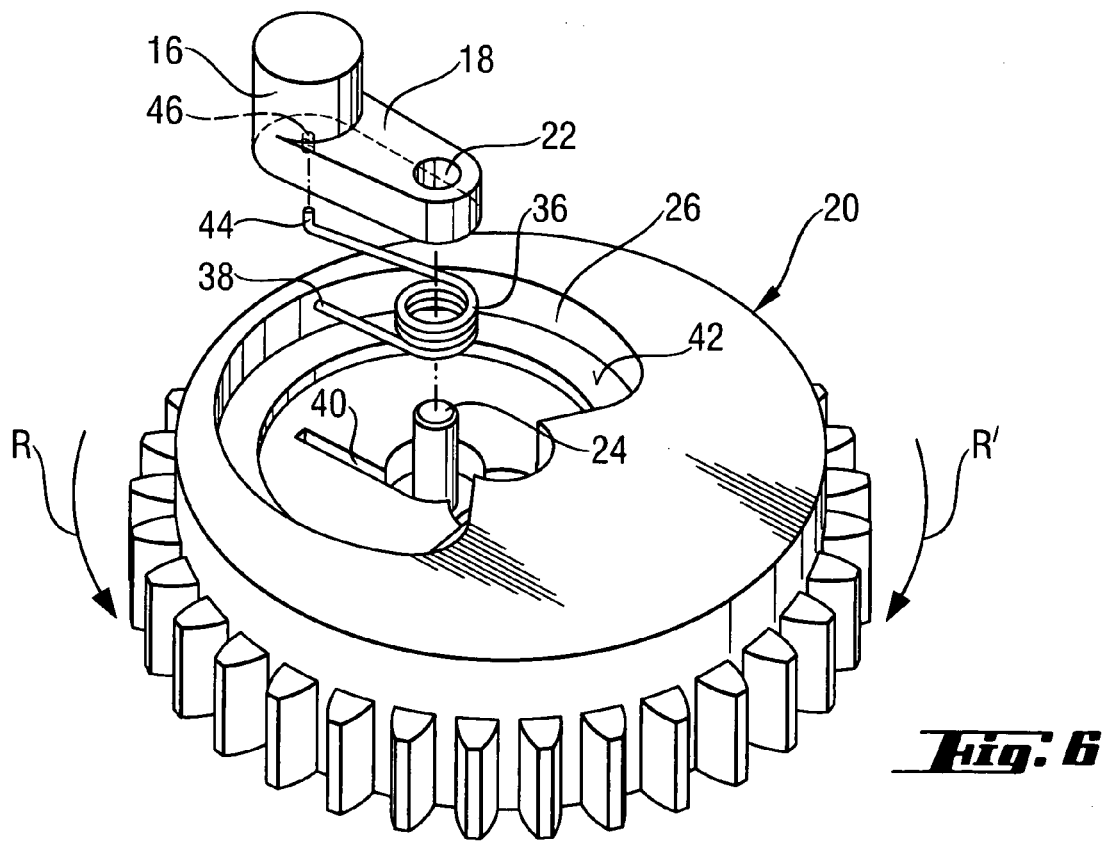

MOVEMENT CONVERSION DEVICE FOR A HAND-HELD POWER TOOL

BACKGROUND OF THE INVENTION

1. Field of Invention

The present invention relates to a movement conversion device for motor-driven power tools such as, e.g. compass and saber saws, for converting a rotational movement into a linear reciprocating movement and including an axially reciprocating spindle provided with a connecting link guide, a motor-driven driving gear, and eccentric member displaceably supported on the driving gear and extending into the connecting link guide for converting the rotational movement of the driving gear into the reciprocating movement of the reciprocating spindle, the eccentric member having, for changing a length of the reciprocating stroke of the reciprocating movement and for changing a load torque acting on the driving gear, a first position with respect to a rotational axis of the driving gear in which a distance between the eccentric member and the rotational axis is greater than in at least one second position of the eccentric member. The present invention also relates to a hand-held power tool including the inventive movement conversion device.

2. Description of the Prior Art

With movement conversion devices of the type described above, there exists a possibility to adapt the tools referred to above to different uses by changing the eccentricity of the eccentric member, i.e., the distance between the eccentric member and the rotational axis of the driving gear. e.g., during the treatment of soft materials, the second position, which is characterized by a greater distance of the eccentric member from the rotational axis, can be selected to provide for a maximal stroke length and, thereby, for a more rapid operation of the power tool.

For treating hard materials, the maximal stroke length can cause overloading of the drive motor. In this case, the first position of the eccentric member is selected, in which the distance from the eccentric member to the rotational axis is small and with which, a greater output of the tool is achieved. In the first position of the eccentric member, the stroke length, along which the reciprocating spindle reciprocates, is adjusted to a minimum so that the motor is not overloaded even at relatively large press-on forces being applied to the treated material.

German Publication DE 36 33 888 discloses a movement conversion device for a compass saw having different stroke lengths for two rotational directions of the drive motor. In the disclosed device, the eccentric disc which is pivotally supported on the driving gear between two stops, is provided with an eccentric pin. When the driving gear rotates counterclockwise, the eccentric disc abuts the first stop. When the driving gear rotates clockwise, the eccentric disc abuts the second stop. The distance between the eccentric pin which is provided on the eccentric disc, and the rotational axis of the driving gear and, thereby, the stoke length or the load applied to the motor changes between the two positions of the eccentric disc.

The drawback of the known conversion device consists in that it can be used in hand-held tools in which the driving gear rotates in both directions. In addition, during a single operational step, the prevailing conditions can change, e.g., when working a material with a variable hardness, or with different possibilities for applying a press-on force by the tool operator. As a result, it might be necessary to change the stoke length several times during a single operational step. In this case, the process should be interrupted, which leads to loss of time. In addition, with materials having a variable hardness, an erroneous position can be set which would result, at least for a short time, in a high load being applied to the motor.

Accordingly, an object of the present invention is to provide a movement conversion device in which the above-discussed drawbacks of the prior art are eliminated.

Another object of the present invention is to provide a movement conversion device that would increase the output of the tool.

SUMMARY OF THE INVENTION

These and other objects of the present invention, which will become apparent hereinafter, are achieved by providing a load-controlled spacing device for automatically adjusting the distance between the eccentric member and the rotational axis of the driving gear.

With the spacing device, the eccentricity of the eccentric member and, thereby, the stroke length of the reciprocating movement is changed automatically dependent on the value of an outer load resistance applied to the reciprocating spindle and without interference of the tool operator. Thereby, a load torque, which is produced by the outer load resistance and which acts on the driving gear, is limited to a value that prevents overloading of the drive motor. As a result, the tool output is automatically optimized at variable prevailing conditions.

In a particular advantageous embodiment of the present invention, the spacing device is formed by a spring element that biases the eccentric member in a direction opposite the rotational direction of the driving gear. The spring element can engage the eccentric member directly or indirectly, e.g., via the eccentric-carrying component. Thereby, a very simple and reliable adjustment of the eccentricity of the eccentric member is achieved.

The eccentricity, i.e., the distance between the eccentric member and the rotational axis of the driving gear depends on a respective outer load resistance, which is transmitted to the eccentric member by the reciprocating spindle, and on the rigidity of the spring element. Thereby, a continuous adaptation of the stroke length to the operational load and, thereby, a corresponding limitation of the loan torque acting on the driving gear are achieved. Thus, an optimal output of the hand-held tool is insured.

Advantageously, the eccentric member is arranged on a pivot lever that is pivotally supported on the driving gear and is arranged, at least partially, in a recess formed in the driving gear. With this arrangement, the movement conversion device can be formed relatively compact in the axial direction of the driving gear. In addition, the side wall of the recess form a suitable support surface for the spring element, e.g., form an end stop for the pivot lever or the eccentric member which the spring element engages.

Advantageously, the spring element is formed as a helical spring acting between the pivot lever and the recess wall. The use of the helical spring substantially reduces the manufacturing costs of the movement conversion device. In addition, the helical spring insures a stable functioning of the spring element.

Preferably, the driving gear has two opposite rotational directions, and the spacing device has spring means for biasing the eccentric member against both opposite directions.

As a result, an automatic adjustment of the stoke length and an optimal output of a hand-held tool is insured in hand-held tools in which the rotational direction can be changed.

The spacing device for hand-held tools rotatable in two directions, has two helical springs which bias the eccentric member in two opposite directions. Thereby it is provided a reliable load-controlled movement conversion device that can be simply produced.

Preferably, the two helical springs have different rigidities, whereby different adjustment characteristics can be provided for the two directions. This permits to adapt the movement conversion device to two different applications.

Alternatively, the spring means has a torsion spring having its two ends engaging, respectively, the driving gear and the eccentric member.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:
FIG. 5 an exploded view of an alternative embodiment of a movement conversion device with two spring elements;
and
FIG. 6 an exploded view of yet another alternative embodiment of a movement conversion device with a torsion spring.

DETAILED DESCRIPTION OF THE PREFERRED EMBODIMENTS

Figure 1:
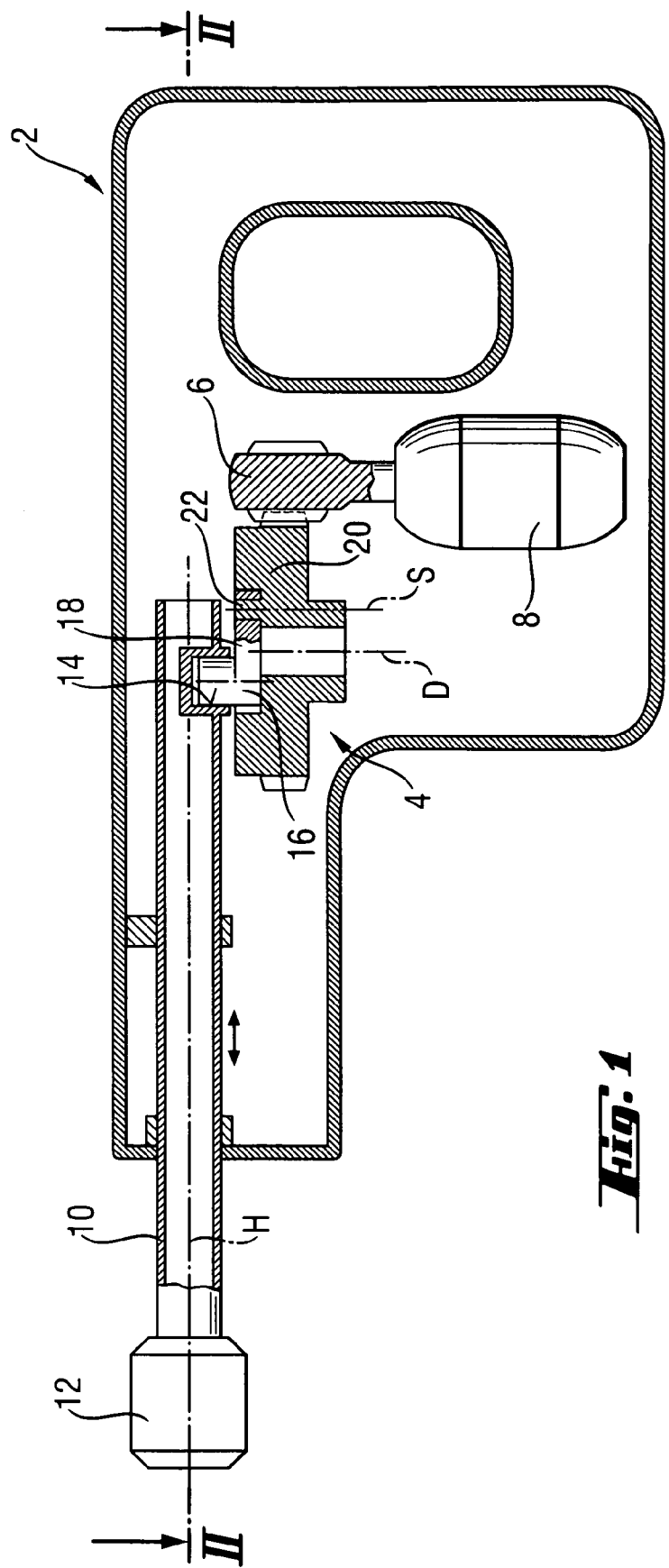
FIG. 1 a longitudinal cross-sectional view of a hand-held power tool with an inventive movement conversion device.

FIG. 1 shows a motor-driven, hand-held power tool 2 in which a rotational movement is converted into a linear movement, e.g., a saw, in particular, a saber saw. The hand-held power tool 2 has a movement conversion device generally designated with a reference numeral 4. The movement conversion device 4 mechanically connects a motor spindle 6 of a driving motor 8 with a reciprocating spindle 10. At the free end of the reciprocating spindle 10, there is provided a tool holder 12 in which a working tool (not shown) such as, e.g., a saw blade is secured. At the end of the reciprocating spindle 10 remote from the tool holder 12, there is provided a connecting link guide 14.

Figure 2:
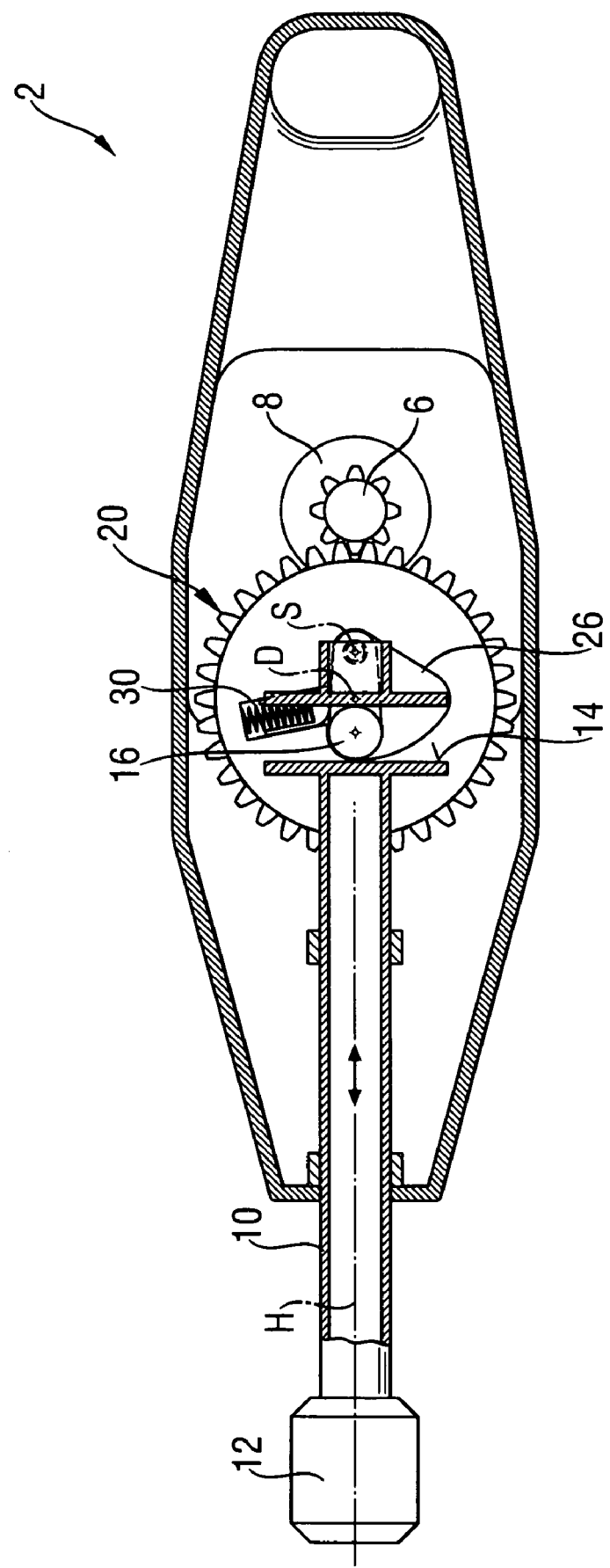
FIG. 2 a cross-sectional view of the tool shown in FIG. 1 along line II-II in FIG. 1 showing a plan view of the inventive movement conversion device.

As particularly shown in FIG. 2, the connecting link guide 14 extends substantially perpendicular to the reciprocation axis H. An eccentric member 16 engages in the connecting link guide 14. As shown in FIG. 1, the eccentric member 16 is formed as one-piece with a pivot lever 18. The pivot lever 18 is supported on a driving gear 20 of the movement conversion device 4 for pivotal movement about a pivot axis S which is spaced from a rotational axis D of the driving gear 20.

Figure 3:
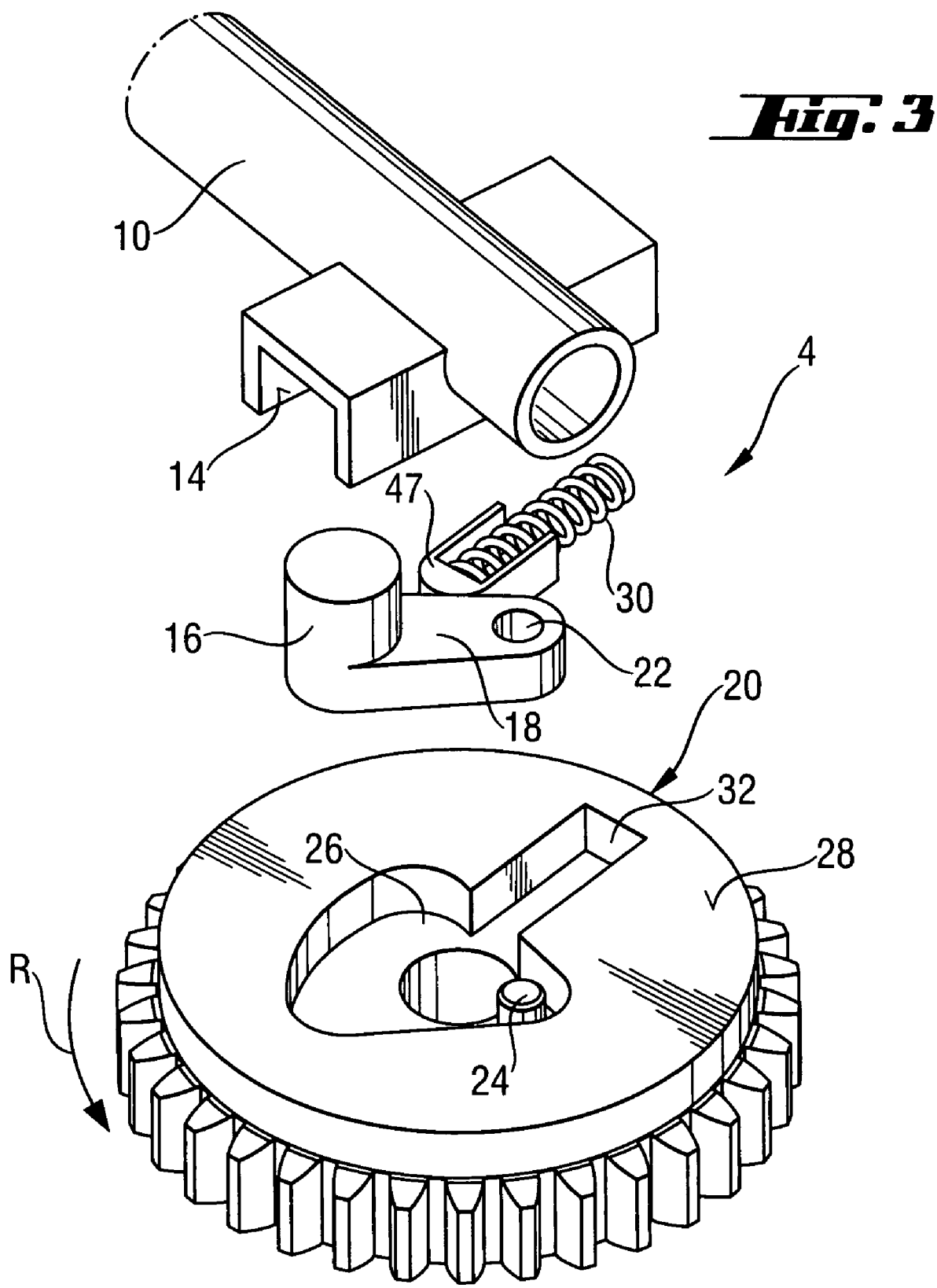
FIG. 3 an exploded view of the inventive movement conversion device.

As particularly shown in FIG. 3, the pivot lever 18 has a bore 22 which provides for a pivotal support of the pivot lever 18 and in which a pin 24 that is provided on the driving gear 20, is received. The pin 24 is arranged within a substantially triangular recess 26 which is formed in the upper surface 28 of the driving gear 20. For locking the pivot lever 18 and the eccentric member 16 provided thereon in a first position in the rotational direction R of the driving gear 20, there is provided a spring element in form of a helical spring 30 with a guide member 47 and which is received in a rectangular recess 32 likewise formed in the upper surface 28 of the driving gear 20 and opening into the recess 26.

Figure 4:
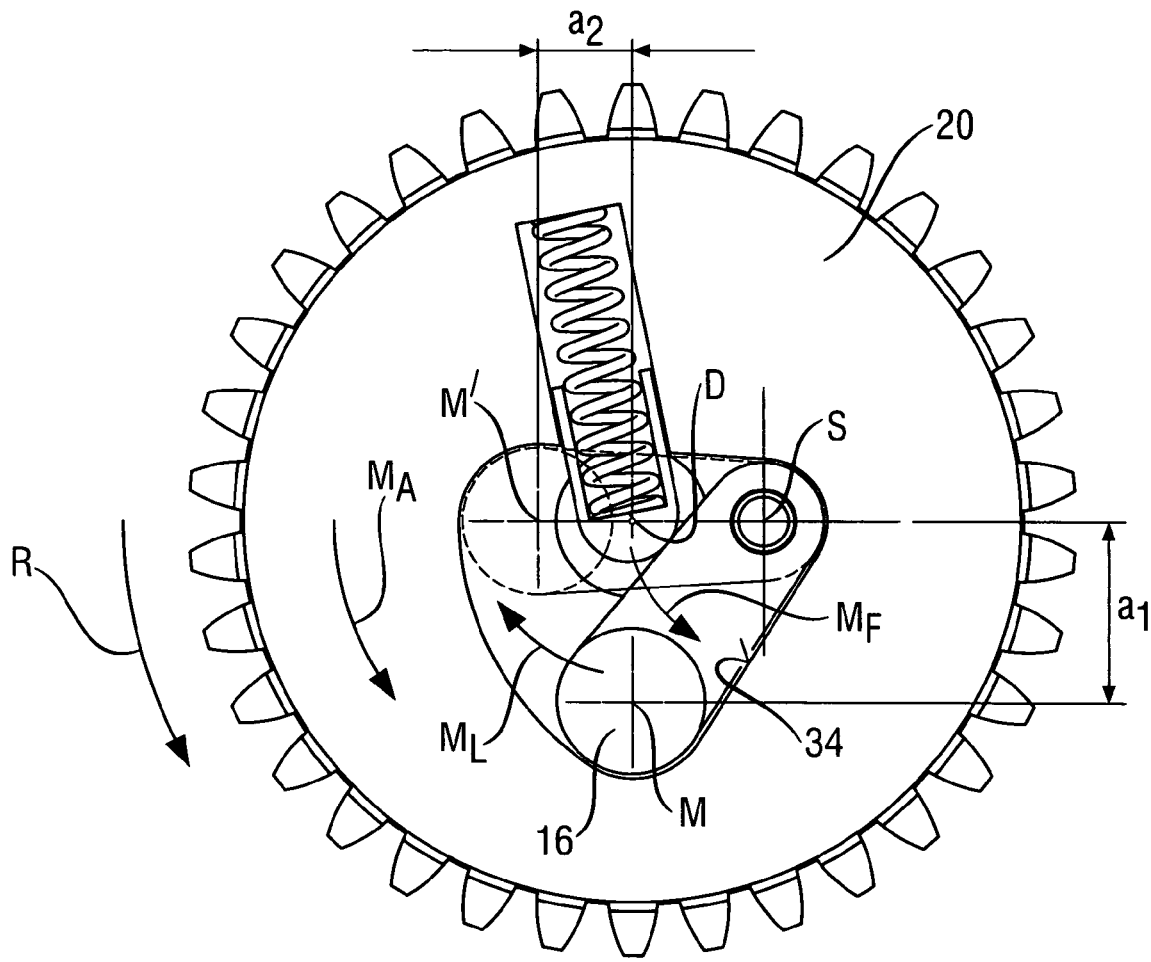
FIG. 4 a plan view of the inventive movement conversion device.

In an unloaded or slightly loaded condition, shown in FIG. 4, the eccentric member 16 is pressed by the helical spring 30 against a side wall 34 of the recess 26 that lies in the rotational direction R. In the first position, the center point M of the eccentric member 16 has an eccentricity a, with respect the rotational axis D of the driving gear 20. Upon turning of the motor 8 on, the eccentric member 16 would pivot, together with its eccentricity a, about the axis D. The eccentric member 16 would reciprocate in the connecting link guide 14 transverse to the reciprocation axis H, which would result in a pure reciprocating movement of the connecting link guide 14 and of the reciprocating spindle 10 along the reciprocation axis H.

During operation, a working tool, which is supported or secured on the tool holder 12 is pressed against a workpiece (not shown), so that the reciprocating spindle 10 acts against a loading resistance. The loading resistance increases with increase of pressure with which the working tool, e.g., a saw blade is pressed against a workpiece, or with increase of hardness of the workpiece. The loading resistance is transmitted by the connecting link guide 14 to the eccentric member 16.

Through the pivot arm 18, the loading resistance acts on the driving gear 20 producing in it a lead torque ML that acts against a drive torque MA which is produced in the driving gear 20 by the drive motor 8 (see FIG. 4). The load torque ML depends on the eccentricity a of the eccentric member 16, on which the load torque acts, with respect to the rotational axis D of the driving gear 20.

The pivotal movement of the eccentric member 16 acts against the biasing force of the helical spring 30, and the smaller is the eccentricity a the greater is the loading resistance acting on the eccentric member 16. The helical spring 16 acts as a spacing device that automatically and continuously adjust the eccentricity of the eccentric member 16 dependent on the external loading resistance that is transmitted to the eccentric member 16 by the reciprocating spindle 10. Thus, during a normal use, by automatically adjusting the lever action of the loading resistance, the load torque ML is limited to a value that provides for a stable operation or driving action of the driving gear 20 at a large as possible length of the reciprocating movement. In this way, an operational output of the hand-held power tool is optimized and an overload of the drive motor 8 is prevented.

FIG. 4 shows, in addition to the first position of the eccentric member 16 in which the eccentricity $a_1$ of the eccentric member 16 with respect to the rotational axis D of the driving gear 20 is maximal, a second position shown with dash lines, in which the pivot lever 18 is maximally pivoted against the helical spring 30 that functions as a spacing device. In the second position, the eccentric member 16 has a minimal eccentricity $a_2$ with respect to the rotational axis D of the driving gear 20. In this position, the load torque ML produced in the driving gear 20, is minimized to a most possible extent, just as the stroke of the reciprocating spindle 10. Dependent on an external loading resistance acting on the reciprocating spindle 10, the eccentric member 16 is continuously adjusted to an eccentricity a lying between the extreme values $a_1$ and $a_2$.

FIGS. 5-6 show other embodiments of the movement conversion device 4 according to the present invention both of which operate in accordance with the above-described principle but are modified so that they also operate in an opposite rotational direction $R^1$ of the driving gear 20. In FIGS. 5-6, the parts corresponding to those of FIGS. 1-4 are designated with the same reference numerals.

In the embodiment shown in FIG. 5, in the upper surface 28 of the driving gear 20, there is provided a recess 26 that is larger than the recess 26 in the embodiment shown in FIGS. 1-4. In the enlarged recess 26 in the embodiment of FIG. 5, two opposite rectangular recesses $32^1$ open in each of which a respective helical spring 30, 30' is arranged. In order to provide for different adjusting characteristics in the two opposite rotational direction $R,R^1$ of the driving gear 20, the two helical springs $30,30^1$ are formed with different spring rigidities.

In the embodiment shown in FIG. 6, instead of helical springs $30,30^1$ there is provided a torsion spring 36. A first end 38 of the torsion spring 36 is located in a corresponding recess 40 formed in the bottom 42 of the recess 26. The second end 44 of the torsion spring 36 engages in a receptacle 46 formed in the eccentric member 16 or in the pivot lever 18. The torsion spring 36 biases the pivot lever 18, together with the eccentric member 16, in a neutral position in which the eccentricity of the eccentric member 16 with respect to the rotational axis D of the driving gear 20 is maximal. Dependent on the rotational direction $R,R^1$ and the value of the external load resistance, the eccentric member 16 would pivot from its neutral position in one or another of the directions $R,R^1$, changing the eccentricity or distance a of the eccentric member 16 with respect to the rotational axis D.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A movement conversion device (4) for a motor-driven, hand-held power tool (2) for converting a rotational movement into a linear reciprocating movement, the device comprising an axially reciprocating spindle (10) provided with a connecting link guide (14); a motor-driven driving gear (20); an eccentric member (16) displaceably supported on the driving gear (20) and extending into the connecting link guide (14) for converting the rotational movement of the driving gear (20) into the reciprocating movement of the reciprocating spindle (10), the eccentric member (16) having, for changing a length of the reciprocating stroke of the reciprocating movement and for changing a load torque acting on the driving gear, a first position with respect to a rotational axis (D) of the driving gear (20) in which a distance (a) between the eccentric member (16) and the rotational axis (D) is greater than in at least one second position of the eccentric member (16); and a load-controlled spacing device associated with the eccentric member (16) for automatically adjusting the distance (a) between the eccentric member (16) and the rotational axis (D) of the driving gear (20).

2. A movement conversion device according to claim 1, wherein the spacing device comprises a spring element for biasing the eccentric member (16) in a direction opposite the rotational direction (R) of the driving gear (20).

3. A movement conversion device according to claim 2, further comprising a pivot lever (18) for supporting the eccentric member (16), the lever being pivotally supported on the driving gear (20) and arranged, at least partially, in a recess (26) formed in the driving gear (20).

4. A movement conversion device according to claim 3, wherein the spring element is formed as a helical spring (30) acting between the pivot lever (18) and a wall of a further recess (32) formed in the driving gear (20).

5. A movement conversion device according to claim 1, wherein the driving gear (20) has two opposite rotational directions $(R,R^1)$, and wherein the spacing device comprises spring means for biasing the eccentric member against both opposite directions $(R,R^1)$.

6. A movement conversion device according to claim 5, wherein the spring means comprises two helical springs (30, $30^1$) for biasing the eccentric member (16) in the two opposite direction $(R,R^1)$, respectively.

7. A movement conversion device according to claim 6 wherein the two helical springs $(30,30^1)$ have different rigidities.

8. A movement conversion device according to claim 5, wherein the spring means comprises a torsion spring (36) having a first end (38) thereof engaging in the driving gear (20) and a second end (44) thereof engaging the eccentric member (16).

9. A hand-held power tool, comprising a tool holder (12); a drive motor (8); and a movement conversion device for converting a rotational movement of a motor shaft into a linear reciprocating movement of the tool holder, the device comprising:

an axially reciprocating spindle (10) provided with a connecting link guide (14), a motor-driven driving gear (20), an eccentric member (16) displaceably supported on the driving gear (20) and extending into the connecting link guide (14) for converting the rotational movement of the driving gear (20) into the reciprocating movement of the reciprocating spindle (10), the eccentric member (16) having, for changing a length of the reciprocating stroke of the reciprocating movement and for changing a load torque acting on the driving gear, a first position with respect to a rotational axis (D) of the driving gear (20) in which a distance (a) between the eccentric member (16) and the rotational axis (D) is greater than in at least one second position of the eccentric member (16), and a load-controlled spacing device associated with the eccentric member (16) for automatically adjusting the distance (a) between the eccentric member (16) and the rotational axis (D) of the driving gear (20).

* * * * *